INVENTOR.
Oscar H. Banker
BY
Stone, Artman + Bisson
Attys

June 9, 1953  O. H. BANKER  2,641,344
CLUTCH CONSTRUCTION
Filed March 28, 1947  3 Sheets-Sheet 2
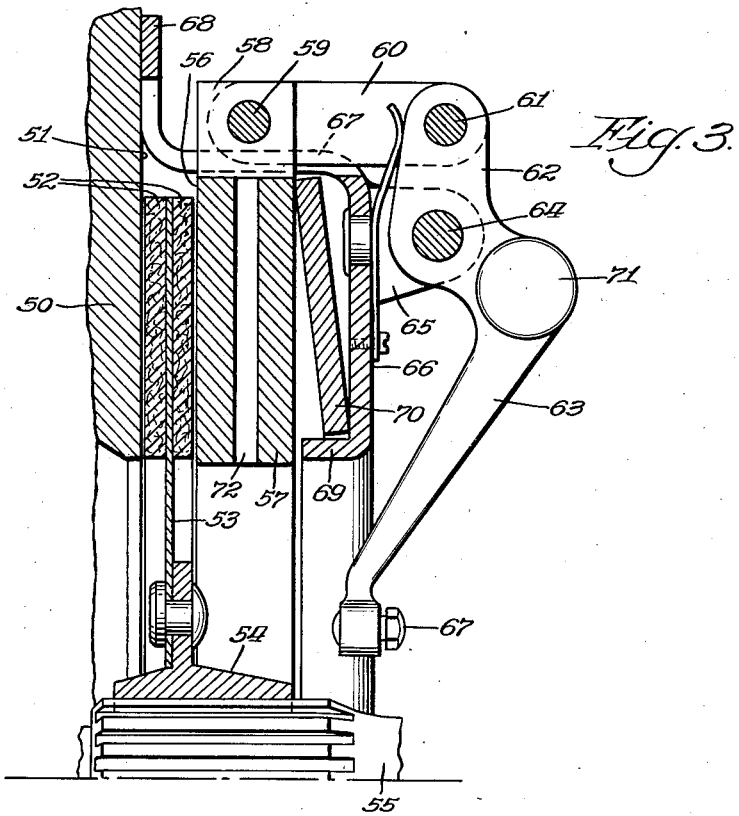
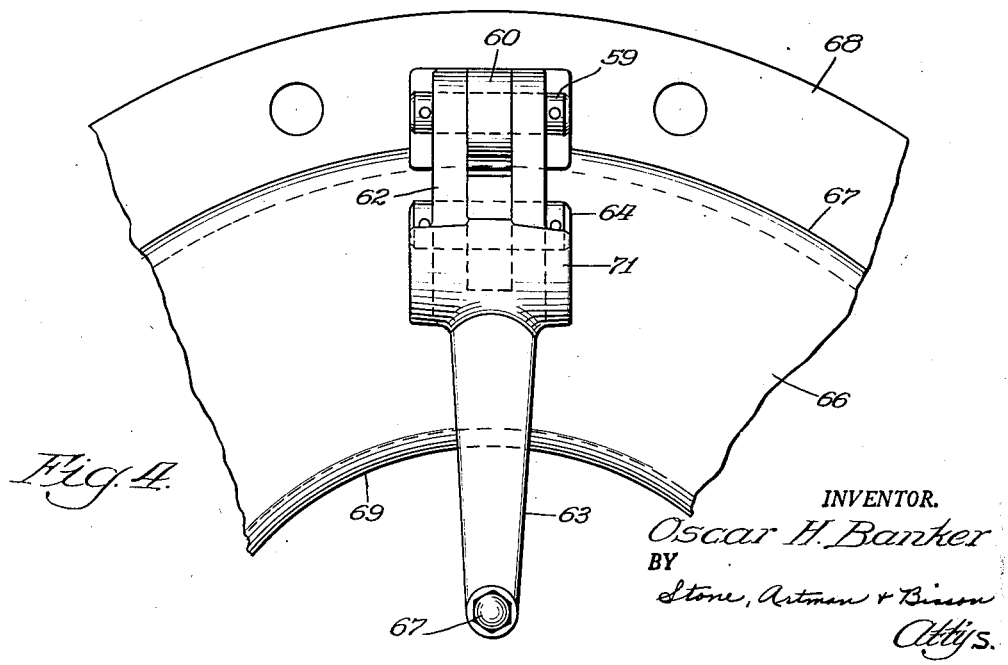
INVENTOR.
Oscar H. Banker
BY
Stone, Artman & Bisson
Attys.

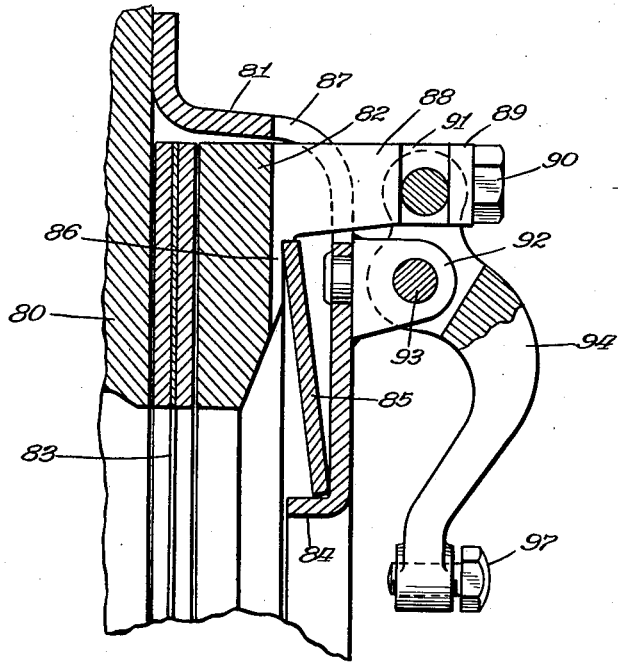
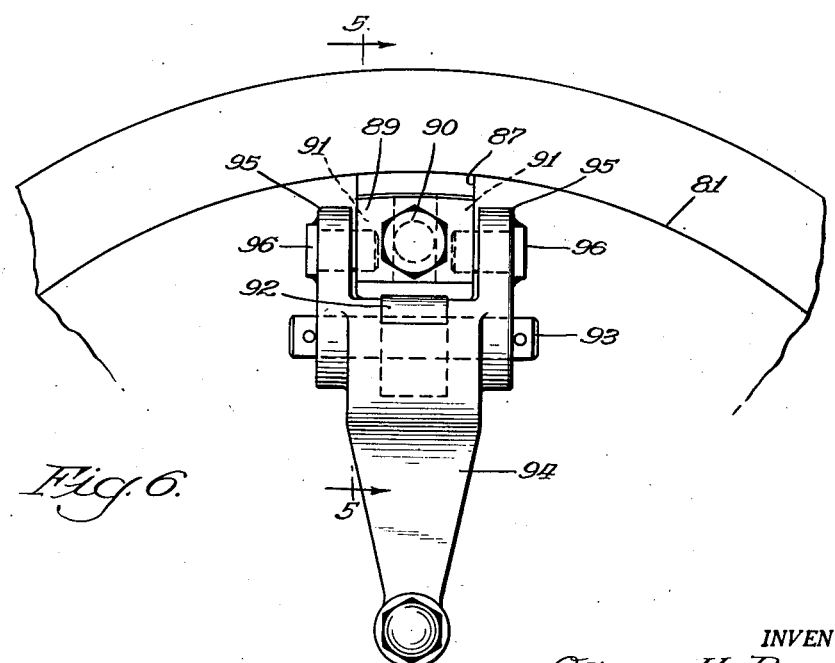

Patented June 9, 1953

2,641,344

UNITED STATES PATENT OFFICE 2,641,344

CLUTCH CONSTRUCTION

Oscar H. Banker, Evanston, Ill., assignor to New Products Corporation, Chicago, Ill.

Application March 28, 1947, Serial No. 737,896

3 Claims. (Cl. 192—68)

This invention relates to a clutch construction and more particularly to a friction clutch of the type commonly employed in automotive vehicles and similar instances.

The usual type of friction clutch operates in conjunction with the flywheel or equivalent reaction structure of an internal combustion engine or other source of power and includes a clutch disk having opposite friction faces engageable between the flywheel and a pressure plate. Spring means normally urges the pressure plate toward the flywheel to grip the clutch disk and this spring means operates between the pressure plate and a cover plate secured to the flywheel for rotation therewith. Operating or throwout arms are pivoted on the outside of the cover plate and are connected to the pressure plate in such a manner that depression of the arms retracts the pressure plate so that the power to the clutch disk is disconnected. Clutches of this type are characterized by various details of construction. Few are desirable from the standpoint of economy of manufacture and operation, simplicity of construction and do not always lend themselves readily to adjustment and repair.

It is therefore a general object of the present invention to provide an improved clutch construction having relatively few parts of simple design that are combined in such a manner as to lend themselves readily to modern manufacturing methods and to provide a construction that is easily assembled, disassembled, repaired and adjusted.

The invention has for another important object the provision of a clutch construction in which the spring means assumes the form of a concavo-convex annulus, which occupies but little space between the pressure plate and cover, thus contributing to the compact organization of the clutch.

Still another object is to provide, in certain forms of the invention, a pressure plate that is optionally interchangeable to present either its front or rear friction face to the clutch disk, which provision enables the pressure plate to be reversed when one side thereof becomes worn; and a related object is the provision of an association of the pressure plate and spring means in such manner that wear on the pressure plate incident to contact with the spring means does not affect the friction face.

A further object of the invention is to adapt the operating elements and linkage to the reversibility or interchangeability of the pressure plate.

Another object is the provision of clutch throwout levers and pressure plate connections therefor of a character that centrifugal force developed in the levers is impressed through such connections onto the pressure plate for augmenting spring force in holding the clutch engaged.

A still further object is the provision of an improved clutch pressure plate having a cylindrical outer periphery to facilitate manufacture thereof in a manner causing it to have a perfect balance when rotating, together with attaching means for clutch throw-out levers, associated with the pressure plate in a manner not disturbing the structural feature facilitating balancing of the plate.

The foregoing and other desirable objects and advantages of the invention will be readily apparent from the following detailed description of preferred forms of the invention as shown in the accompanying sheets of drawings in which.

Figures 1, 2:
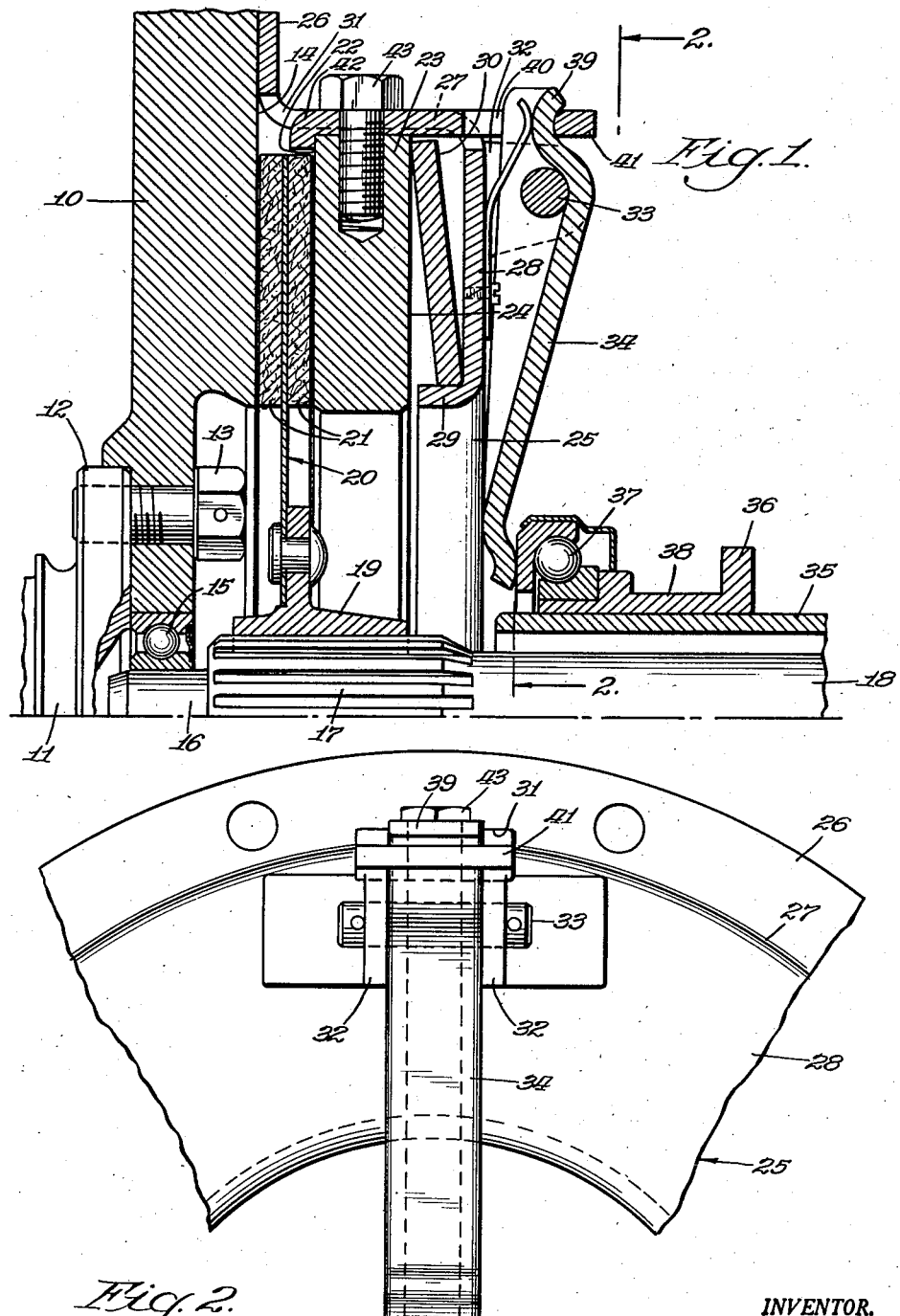
Fig. 1 is a longitudinal sectional view through the upper half of a clutch construction based upon one embodiment of the invention.
Fig. 2 is a rear view of the clutch construction of Fig. 1, the view being taken on the line 2—2 of Fig. 1.

Figs. 3 and 4 are views similar to Figs. 1 and 2 but showing another form of the invention; and Figs. 5 and 6 are similar views of another form of the invention.

Although reference will be made herein to the clutch construction as particularly adaptable for use in automotive vehicles, it should be understood that the principles of the invention are applicable in other instances. Accordingly the present disclosure should be taken as illustrative and not limiting.

Figs. 1 and 2

The form of the invention shown in Figs. 1 and 2 is adapted for use in conjunction with the flywheel of an internal combustion engine, the flywheel being designated by the numeral 10 and being shown as mounted on an engine crankshaft, the rear portion of which is shown at 11 as including an integral circular flange 12 to which the flywheel is secured by a plurality of bolts 13, only one of which is shown. The flywheel has a rear flat friction face 14. The centrally internal portion of the flywheel is provided with an antifriction pilot bearing 15 which pilots the forward reduced end of a driven shaft 16, the intermediate portion of which is splined as at 17 and the rear portion of which, at 18, extends rearwardly for connection to a change-speed transmission (not shown) in the usual manner.

The splined portion 17 of the driven shaft carries for rotation therewith a hub 19 of a clutch disk 20. This disk may be of usual construction and may have opposite friction facings 21 carried thereby. The friction facings thus present the front friction face engageable with the rear friction face 14 of the flywheel 10 and a rear friction face engageable with a front friction face 22 on a pressure plate 23. The pressure plate is in the form of an annulus concentric with the flywheel 10 and clutch disk 20 and has a rear friction face 24. A circular cover structure 25 encloses or houses the pressure plate 23 and clutch disk 20 and has provided thereon portions adapted to be secured to the flywheel 10 for rotation therewith. In the present instance the portion secured to the flywheel 10 is shown as a peripheral radial flange 26 integral with a peripheral cylindrical portion 27 which is in turn integral with a rear radial wall portion 28 that is spaced rearwardly from the rear friction face 24 of the pressure plate 23. The cover plate structure as a whole is dished and is in the form of an annulus, the inner peripheral edge of which is flanged to provide an inner integral ring portion 29 that extends generally axially forward toward the rear face 24 of the pressure plate 23. Normally the front edge of the flange 29 is spaced rearwardly from the rear friction face 24 of the pressure plate.

The dished portion of the cover 25 between the inner peripheral flange 29 and the outer peripheral wall 27 houses spring means normally functioning to urge the pressure plate 23 toward the flywheel 10 to grip the friction facings 21 of the clutch disk 20 therebetween. The spring means may take the form of an annular concavo-convex element 30, preferably of the type known as a Belleville spring. The inner flange 29 on the cover 25 provides a seat or centering means for the inner periphery of the spring element 30. The spring in cross section inclines radially outwardly and axially toward the pressure plate 23 and the front edge of the outer periphery of the spring engages the rear friction face 24 of the pressure plate 23 on a circular line of contact of a diameter greater than the diameter of the friction facings 21 on the clutch disk 20. The portion of the friction face 24 of the pressure plate 23 may thus be said to provide a seat for the outer peripheral edge of the concavo-convex spring element 30.

The outer cylindrical wall portion 27 of the cover 25 is provided with a plurality of circumferentially spaced openings 31 (only one of which is shown). The rear wall 28 of the cover 25 carries a plurality of circumferentially spaced mounting elements or pivot means in the form of ears 32 (only one pair of which is shown). Each pair of ears carries on a transverse pivot pin 33 for a radially inwardly extending clutch operating element in the form of a throwout arm 34.

The rearwardly extending portion 18 of the clutch or driven shaft is surrounded by an axially extending sleeve 35. Such sleeve is usually rigidly carried by stationary parts of the structure in which the clutch is mounted. Since such structure is conventional, it is not shown here. The sleeve 35 carries for axial movement thereon a throwout collar 36 which includes at its forward end an antifriction throwout bearing 37. An annular groove 38 is provided in the collar 36 and is normally engaged by a throwout yoke (not shown) which functions to move the throwout collar and bearing 37 forwardly into contact with the throwout arm 34 to pivot the latter in a clockwise direction about its pivot pin 33. The upper end of the throwout arm 34 is provided with a hooked portion 39 which enters an opening 40 in an actuating link 41. The link 41 extends axially forwardly through one of the openings 31 in the cover 25, it being understood that there are a plurality of arms 34 and links 41 and that the links 41 extend respectively through the plurality of openings 31. The forward portion of the link 41 is hooked at 42 over a forward face portion of the pressure plate 23. Radially extending attaching means secure the links 41 to the pressure plate 23. In the present instance only one such means is shown and herein takes the form of a cap screw 43 threaded into a threaded radially extending bore in the pressure plate. The association between the hooked end 42 of the link 41 and the cap screw 43 is such as to rigidly secure the link 41 to the pressure plate. When the throwout arm is pivoted as aforesaid, the operating connection effected by the link 41 causes the pressure plate 23 to be retracted or moved rearwardly against the action of the spring 30 for disengagement of the clutch.

As best shown in Fig. 2, it will be seen that each link 41, in its lateral extent, substantially occupies the opening 31 in the cover plate 25. Since the links 41 are secured to the pressure plate 23 they act as keys between the pressure plate and cover plate and constrain the former for rotation with the latter.

It is an important feature of this phase of the invention that the contact between the annular spring element 30 and the pressure plate 23 is on a circle having a diameter larger than the diameter of the friction facings 21 on the clutch disk 20. When the front friction face 22 of the pressure plate 23 becomes worn, the pressure plate may be reversed and may be positioned with its rear face 24 engageable with the rear friction facing of the clutch disk 20 (or of a replacement clutch disk, as would ordinarily be the case). Inasmuch as the circular line of contact between the pressure plate 23 and spring element 30 is radially beyond the usable friction face portion of the pressure plate, the results of wear on the pressure plate incident to contact with the spring 30 do not affect that portion of the friction face that is engageable with the friction facing 21 on the clutch disk 20.

When the pressure plate 23 is reversed in the clutch assembly it is necessary merely to loosen the cap screws 43 so that the links 41 may be swung freely about through 180° so that they extend toward the other side of the pressure plate. The cap screws, of course, are then tightened and the links 41 will then occupy the same positions relative to the throwout arms 34 as shown in Fig. 1.

It will be further noted that the inner spring centering flange 29 on the cover 25 extends axially forward toward the pressure plate 23 and that the front edge thereof terminates in rearwardly spaced relationship to the pressure plate. This element of the construction provides a stop that serves to limit axially rearward movement of the pressure plate when retracted so that it cannot flatten the concavo-convex spring element 30.

*Figs. 3 and 4*

The form of the invention shown in Figs. 3 and 4 is somewhat similar to that previously described. In this instance a flywheel is designated at 50 and has a rear friction face 51 adapted to be engaged by the front friction face of a pair of friction facings 52 carried by a clutch disk 53. The disk is mounted on a hub 54 which is in turn splined to a clutch shaft 55. The outer friction face provided on the rearward friction facing 52 is engageable by a front friction face 56 on a pressure plate 57. This pressure plate is in the form of an annulus having a plurality of radially outwardly extending connecting portions 58 circumferentially spaced about its periphery. In the drawings only one such portion 58 is shown. Each portion 58 is bifurcated and carries a transversely extending pivot pin 59 by means of which an operating link 60 is pivotally connected by means of a pivot pin 61 to a bifurcated arm portion 62 on an operating or throwout arm 63. The arm is pivoted intermediate its ends on a pin 64 carried by a pair of ears 65 riveted and welded, or otherwise rigidly secured to the rear face of an annular cover plate 66. The arm 63 extends radially inwardly toward the shaft 55 and is provided with an adjustable stud 67 adapted to be contacted by a throwout bearing (not shown), similar to the structure 36—37—38 of Fig. 1.

The cover plate 66 includes an outer peripheral flange portion 67 which continues into a radially outwardly extending annular flange 68. The flange 68 is rigidly secured to the rear face of the flywheel 50. The annular flange portion 67 is slotted at circumferentially spaced points thereon to accommodate the operating links 60 and the connecting portions 58 on the pressure plate 57. The rear wall of the cover plate 66 extends radially inwardly and terminates in an integral inner annular flange 69, the diameter of which is substantially equal to the diameter of the axial opening through the pressure plate 57. The cover plate 66 is very similar to the cover plate 25 previously described.

The radial wall portion of the cover plate 66 is spaced an appreciable distance rearwardly of the rear face of the pressure plate 57. Within this space is carried an annular spring 70 which, like the spring 30 of Fig. 1, may be of the Belleville type. The inner annular portion 69 of the cover plate 66 provides a seat for the inner marginal edge of the spring 70. The outer forward peripheral edge of the spring 70 seats against the rear face of the pressure plate 57 and functions to urge the pressure plate forwardly so that the friction facings 52 of the clutch disk 53 are gripped between the pressure plate 57 and the rear face 51 of the flywheel 50. Actuation of the throwout arm 63 functions through the links 60 to retract the pressure plate 57 against the spring 70 so that the clutch disk 53 may be disengaged from the flywheel 50 and pressure plate 57.

The relationship between the pressure plate 57 and annular spring 70 corresponds generally to the relationship between the pressure plate 23 and spring 30 of Fig. 1; that is to say, the outer peripheral edge of the spring 70 contacts the rear face of the pressure plate on a circle thereon that has a diameter larger than the diameter of the clutch disk 53, so that the pressure plate 57 may be reversed in the assembly and any wear incident to contact between the pressure plate and spring 70 will be radially outside the clutch disk 53.

Another feature of the construction shown in Figs. 3 and 4 is that the operating or throwout arm is weighted intermediate its ends as at 71, which construction enables the centrifugal force resulting from rotation of the assembly to act on the plurality of arms 63 in such manner that the arms are urged outwardly and react through the links 60 to urge the pressure plate 57 into tighter gripping engagement with the clutch disk 53.

A further feature of the construction being presently described consists in the provision of a plurality of radial passages 72 (only one of which is shown in Fig. 3) in the pressure plate 57. These passages provide for increased ventilation of the clutch assembly and serve to facilitate the dissipation of heat generated in the pressure plate.

When the pressure plate 57 is reversed in the assembly to present a new friction face to the clutch disk 53, the links 60 may be swung about their pivots 59 to accommodate the new position of the pressure plate and it is not necessary to disconnect these links except at their points of connection with the throwout arms 63.

*Figs. 5 and 6*

In this form of the invention a flywheel 80 has associated therewith a clutch assembly comprising a cover plate 81, a pressure plate 82 and a clutch disk 83. The cover plate is similar in construction to the cover plates previously described and includes an inner annular flange portion 84 on which seats the inner peripheral edge of a Belleville spring 85. The outer peripheral edge of the spring 85 cooperates with a seating portion 86 (only one of which is shown) on the pressure plate 82, the action of the spring being such that the pressure plate 82 is urged forwardly to cooperate with the flywheel to grip the clutch disk 83.

The cover plate 81 is slotted at a plurality of circumferentially spaced portions thereon, as at 87, to accommodate a plurality of rearwardly extending bosses 88 formed integral with and projecting rearwardly from the pressure plate 82. Only one of such bosses 88 is shown but it will be understood that there are a plurality of these bosses spaced circumferentially about the pressure plate. Each boss 88 is reduced in width at its end portion and carries a hardened steel plate 89. The plate 89 is removably secured to the boss 88 by a cap screw 90. The relationship between the plate 89 and the reduced portion of the boss 88 is such as to provide a pair of opposed radially extending slots 91 at the outer end of the boss.

The cover plate 81 carries on its radial wall portion a plurality of circumferentially spaced mounting elements in the form of ears 92 (only one of which is shown in Fig. 5). Each ear 92 carries a transverse pivot pin 93 on which is pivotally mounted an operating or throwout arm 94. The radially outermost end of the arm 94 is bifurcated to provide two portions 95 which straddle the rear or outer end of the boss 88. Each portion 95 carries an inwardly extending stud or trunnion 96, which trunnions cooperate respectively with the slots 91 in the bosses. The inner end of the arm 94 is provided with an adjustable cap screw 97 which is adapted for association with a throwout bearing structure of the type described in connection with the structure of Figs. 3 and 4. The cap screws 97, like the cap screws 67 of Fig. 3, are adjustable to compensate for any manufacturing errors. The arm 94 is curved intermediate its ends in such manner that the weight of the arm is concentrated to enable the arms to tend to swing outwardly because of centrifugal force created during rotation of the assembly, this action of the arms resulting in increased pressure on the pressure plate 82.

*In general*

The general arrangement of each of the clutch constructions illustrated and described is such that the clutch assembly is structurally compact and is highly efficient from the standpoints of manufacture, operation and assembly and disassembly. The specific characteristics of each will be readily apparent to those skilled in the art. It will be understood, of course, that the assemblies illustrated and described are only preferred embodiments of the invention and it is intended to

What is claimed is:

1. A friction clutch for mounting on a flywheel having an annular rear friction face, comprising: a clutch disk having front and rear friction faces, the front face being adapted for engagement with the friction face of the flywheel; a pressure plate having front and rear friction faces, each of which is of a diameter greater than the rear friction face of the clutch disk, said pressure plate being constructed and arranged for interchangeable positioning with either face thereof engageable with the rear face of the clutch disk; a cover having portions for mounting on the flywheel and a portion substantially enclosing the pressure plate and clutch disk; spring-centering means on a front portion of the cover coaxial with the pressure plate; spring means for urging the pressure plate forwardly against the clutch disk and including an annular concavo-convex element having its inner peripheral portion seated on the centering means of the cover and its outer peripheral portion seating on the pressure plate, the outer diameter of the concavo-convex element being greater than the diameter of the clutch disk, whereby, when the pressure plate is reversed to present its rear face to the clutch disk, the results of wear thereof incident to contact with the concavo-convex element will be radially beyond the friction face thereof.

2. A friction clutch for mounting on a flywheel having an annular rear friction face, comprising: a clutch disk having front and rear friction faces, the front face being adapted for engagement with the friction face of the flywheel; a pressure plate having front and rear friction faces, each of which is of a diameter greater than the rear friction face of the clutch disk, said pressure plate being constructed and arranged for interchangeable positioning with either face thereof engageable with the rear face of the clutch disk; a spring-seating portion on each side of the pressure plate radially outside the friction face thereof; a cover having portions for mounting on the flywheel and a portion substantially enclosing the pressure plate and clutch disk; spring-centering means on a front portion of the cover coaxial with the pressure plate; spring means for urging the pressure plate forwardly against the clutch disk and including an annular concavo-convex element having its inner peripheral portion seated on the centering means of the cover and its outer peripheral portion seating on the proximate of the aforesaid seating portions of the pressure plate, whereby, when the pressure plate is reversed to present its rear face to the clutch disk, the results of wear thereof incident to contact with the concavo-convex element will be radially beyond the friction face thereof.

3. A friction clutch for mounting on a flywheel having an annular rear friction face, comprising: a clutch disk having opposite annular friction faces, one of which is engageable with the friction face of the flywheel; a pressure plate having front and rear faces, the front face comprising a friction face engageable with the other face of the clutch disk; a circular dished cover housing the disk and plate, having peripheral portions adapted for mounting on the flywheel, and including an inner annular flange projecting axially toward the pressure plate, the cover being constructed and arranged with respect to the pressure plate so that an annular space is provided between the rear face of the pressure plate and the front of the cover; spring means for urging the pressure plate toward the flywheel for gripping the clutch disk therebetween, and including an annular concavo-convex element enclosed in the aforesaid annular space, said element including an inner peripheral portion seating on the inner flange of the cover and having an outer peripheral portion seating on the rear face of the cover plate; and clutch-operating means connected between the cover and pressure plate and operable to retract the pressure plate against the concavo-convex element, the forward axial extent of the inner flange on the cover being so constructed and arranged as to provide means for limiting movement of the pressure plate toward the cover.

OSCAR H. BANKER.

References Cited in the file of this patent

UNITED STATES PATENTS

| Number | Name | Date |
|---|---|---|
| 2,082,655 | Reed | June 1, 1937 |
| 2,168,960 | Morris | Aug. 8, 1939 |
| 2,171,908 | Beringer | Sept. 5, 1939 |
| 2,219,139 | Nutt et al. | Oct. 22, 1940 |
| 2,277,221 | Gamble | Mar. 24, 1942 |
| 2,359,184 | Wolfram | Sept. 26, 1944 |

FOREIGN PATENTS

| Number | Country | Date |
|---|---|---|
| 554,238 | Great Britain | June 25, 1943 |